US010075352B2

(12) United States Patent
Gukal (10) Patent No.: US 10,075,352 B2
(45) Date of Patent: Sep. 11, 2018

(54) MONITORING USER TERMINAL APPLICATIONS USING PERFORMANCE STATISTICS FOR COMBINATIONS OF DIFFERENT REPORTED CHARACTERISTIC DIMENSIONS AND VALUES

(71) Applicant: CA, INC., New York, NY (US)

(72) Inventor: Sreenivas Gukal, Santa Clara, CA (US)

(73) Assignee: CA, INC., New York, NY (US)

( * ) Notice: Subject to any disclaimer, the term of this patent is extended or adjusted under 35 U.S.C. 154(b) by 634 days.

(21) Appl. No.: 14/564,235

(22) Filed: Dec. 9, 2014

(65) Prior Publication Data

US 2016/0164754 A1 Jun. 9, 2016

(51) Int. Cl.
*G06F 15/173* (2006.01)
*H04L 12/26* (2006.01)
*H04L 12/24* (2006.01)

(52) U.S. Cl.
CPC ............ *H04L 43/04* (2013.01); *H04L 43/065* (2013.01); *H04L 43/067* (2013.01); *H04L 41/142* (2013.01)

(58) Field of Classification Search
CPC ..... H04L 41/142; H04L 43/04; H04L 43/065; H04L 43/067
See application file for complete search history.

(56) References Cited

U.S. PATENT DOCUMENTS 6,360,337 B1 * 3/2002 Zak ..................... G06F 11/3409
713/502
2009/0265576 A1 * 10/2009 Blum ................... H04L 41/026
714/2
2010/0091676 A1 * 4/2010 Moran ..................... H04L 47/10
370/252
2012/0260236 A1 * 10/2012 Basak ................... G06F 11/323
717/132
2013/0198266 A1 * 8/2013 Kiley ...................... H04L 67/34
709/203
2014/0122594 A1 * 5/2014 Uzunalioglu ........... H04L 67/22
709/204
2014/0229608 A1 * 8/2014 Bauer ................... H04L 41/142
709/224
2014/0351394 A1 * 11/2014 Elisha ................. H04L 41/0806
709/222
2014/0355566 A1 * 12/2014 Walley ................ H04W 36/245
370/331

* cited by examiner

*Primary Examiner* — June Y Sison
*Assistant Examiner* — Dixon F Dabipi
(74) *Attorney, Agent, or Firm* — Sage Patent Group (57) ABSTRACT

An application analysis computer receives reports from user terminals which contain application performance metrics and dimensions having values characterizing the applications and the user terminals. Statistics for each different one of the performance metrics across the reports are generated for repeating time intervals. One of the statistics that has changed between two of the time intervals by an amount that satisfies a defined rule is identified, and the associated performance metric is selected for analysis. For each combination of a different one of the dimensions and a different one of the values occurring for the dimension, a statistic is generated for the selected performance metric associated with the combination, and a counter is incremented that tracks a number of occurrences of the combination among the reports. Sets of the statistic and the counter for particular ones of the combinations that satisfy an action rule are identified.

19 Claims, 6 Drawing Sheets

MONITORING USER TERMINAL APPLICATIONS USING PERFORMANCE STATISTICS FOR COMBINATIONS OF DIFFERENT REPORTED CHARACTERISTIC DIMENSIONS AND VALUES

BACKGROUND

The present disclosure relates to computing systems, and, in particular, to management of user terminals, applications, and/or application servers.

Increasingly, users install a myriad of different types of application programs (also commonly referred to as "applications" and "apps") on user terminals having widely varying software and hardware characteristics. For example, users can select from among several million different applications available on various application servers for downloading to cellular telephones (sometimes called "smart phones"), tablet computers, laptop computers, and other types of user terminals for processing. Over a billion Apple IOS user terminals and Android user terminals are presently being used throughout the world.

Mobile analytics is an emerging technology that seeks to measure performance of applications processed by user terminals. Using mobile analytics processes, user terminals can collectively generate millions of performance reports every day for processing by an analysis computer. Analysis of the performance reports can require expensive and complex hardware and software resources and the analysis can be prone to excessive error or reduced usefulness due to the tremendous number of combinations of differing application characteristics and user terminal characteristics from which individual reports are generated.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

Some embodiments of the present disclosure are directed to a computer program product that includes a non-transitory computer readable storage medium including computer readable program code embodied in the medium that when executed by a processor of an application analysis computer causes the processor to perform operations. The operations include receiving, from user terminals, reports containing performance metrics for applications processed by the user terminals and characteristic dimensions having values characterizing the applications and the user terminals. Statistics for each different one of the performance metrics across the reports are generated for repeating time intervals. One of the statistics for one of the performance metrics that has changed between two of the time intervals by an amount that satisfies a defined rule is identified. The one of the performance metrics is selected for analysis. For each combination of a different one of the characteristic dimensions and a different one of the values occurring for the characteristic dimension, a statistic is generated for the selected one of the performance metrics associated with the combination of the characteristic dimension and the value among the reports, and a counter in incremented to track a number of occurrences of the combination of the characteristic dimension and the value among the reports. Sets of the statistic and the counter for particular ones of the combinations of the characteristic dimension and the value that satisfy an action rule are identified. A message is generated which contains information that is defined based on the sets.

Other computer program products, methods, and systems according to embodiments of the present disclosure will be or become apparent to one with skill in the art upon review of the following drawings and detailed description. It is intended that all such additional computer program products, methods, and systems be included within this description, be within the scope of the present disclosure, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Some embodiments of the present disclosure are directed to improved processes for analyzing performance metrics reported by user terminals. Although the reports can be received from a tremendous number of combinations of differing application characteristics and user terminal characteristics, various embodiments disclosed herein may operate to generate and organize the performance metrics from the reports in ways that facilitate use of less expensive and/or reduced complexity hardware and software resources.

Figure 1:
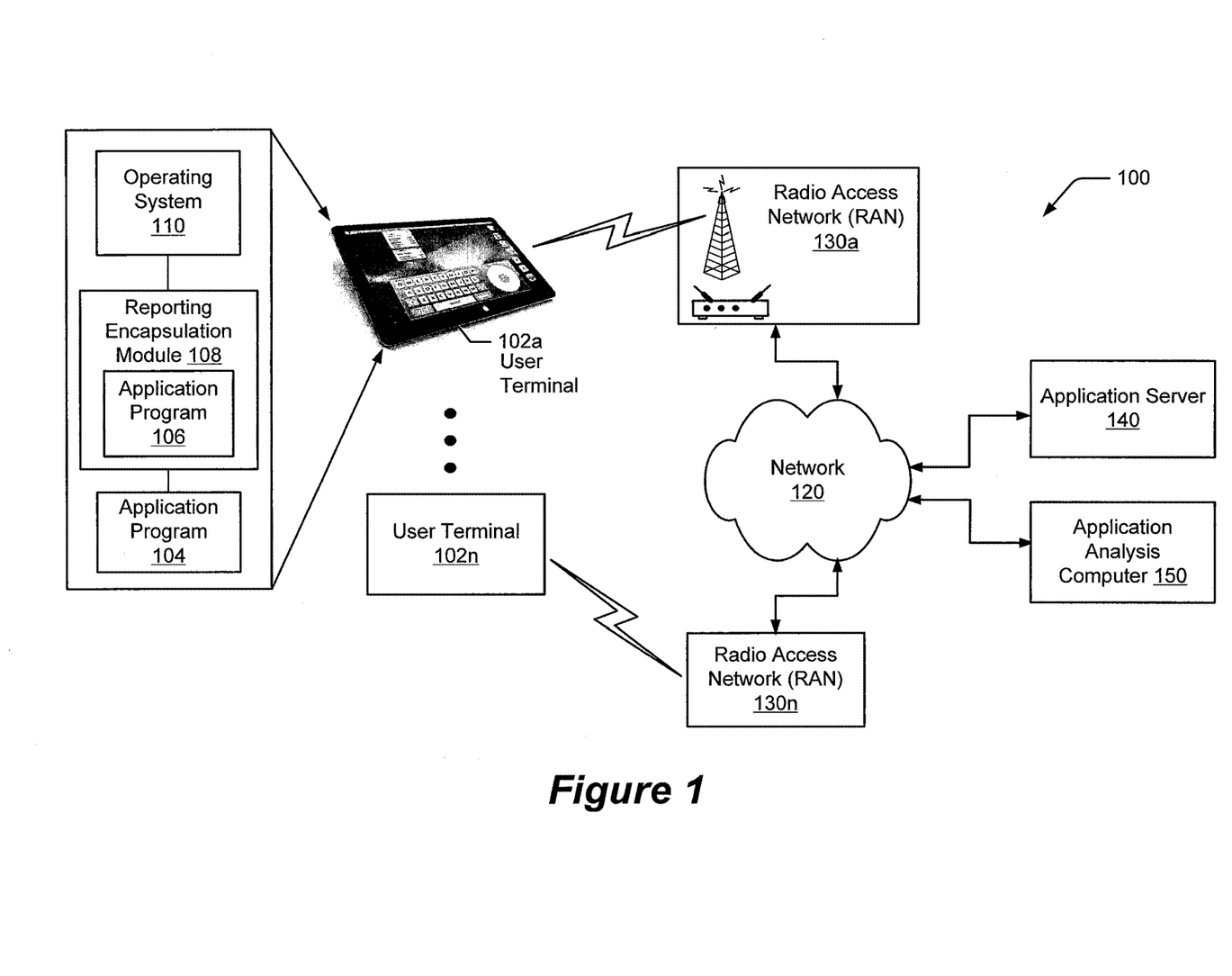
FIG. 1 is a block diagram of a system for analyzing operation of applications processed by user terminals using reported performance metrics and statistics generated from selected performance metrics associated with combinations of different characteristic dimensions and different values among the reports, in accordance with some embodiments of the present disclosure.

FIG. 1 is a block diagram of a system 100 for analyzing operation of applications processed by user terminals using reported performance metrics and statistics generated from selected performance metrics associated with combinations of different characteristic dimensions and different values among the reports, in accordance with some embodiments of the present disclosure. The system 100 includes an application analysis computer 150 which receives reports from user terminals 102a-n through wireless network communications (e.g., radio access networks (RAN) 130a-130n) and/or wired network communications via a data network 120. The data network 120 may be a private network and/or a public network such as the Internet. One or more of the user terminals 102a-102n may communicate through the radio access networks 130a-130n using one or more wireless communication protocols that may include, but are not limited to, 3GPP Long Term Evolution (LTE), WLAN (IEEE 802.11), WiMax, Bluetooth, etc.

The user terminals 102a-102n can download application programs from the application server 140. The application server 140 may, for example, include an Apple application store server (e.g., iTunes), an Android application store server (e.g., Google Play and/or Amazon Appstore), and/or a Window application store server (e.g., Microsoft Windows Store). Although the application analysis computer 150 has been illustrated as being separate from the application server 140, some or all of the functionality of the application analysis computer 150 disclosed herein may be combined with the application server 140 or another computer node ("network node") communicatively connected to the network 120.

The application programs may include gaming programs, spreadsheet programs, multimedia programs, word processing programs, database programs, presentation programs, etc. The application programs may be selected from among several million different applications available from application servers for downloading to many different types of user terminals. The user terminals 102a-102n may include cellular telephones (sometimes called "smart phones"), tablet computers, laptop computers, and other types of electronic communication devices configured for processing applications.

Although FIG. 1 illustrates a certain number of system components for ease of illustration and explanation, it is to be understood that embodiments of the present disclosure are not limited to the illustrated configuration but instead are intended to encompass any configuration capable of carrying out at least some of the operations described herein.

Each of the user terminals 102a-102n (individually referred to as "user terminal 102") may include an instrument encapsulation module 108 that operates to generate reports containing performance metrics for an application program 106 ("application") processed by processor of the user terminal 102 and characteristic dimensions having values characterizing the application 106 and the user terminal 102. The instrument encapsulation module 108 may "wrap around" the application program 106 to intercept or otherwise observe application programming interface (API) calls from the application program 106 to other application programs 104 processed by the user terminal 102, an operating system 110 processed by the user terminal 102, and/or other software/hardware resources of the user terminal 102.

As used herein, an "API request" can be any signaling occurring from one to another software application that may be performed using a defined syntax and one or more parameters (e.g., data structure, object classes, and/or variables) to obtain data therefrom and/or to provide data thereto. For example, SOAP and REST service requests can be performed using a defined API library of remote calls or other types of API requests.

Figure 2:
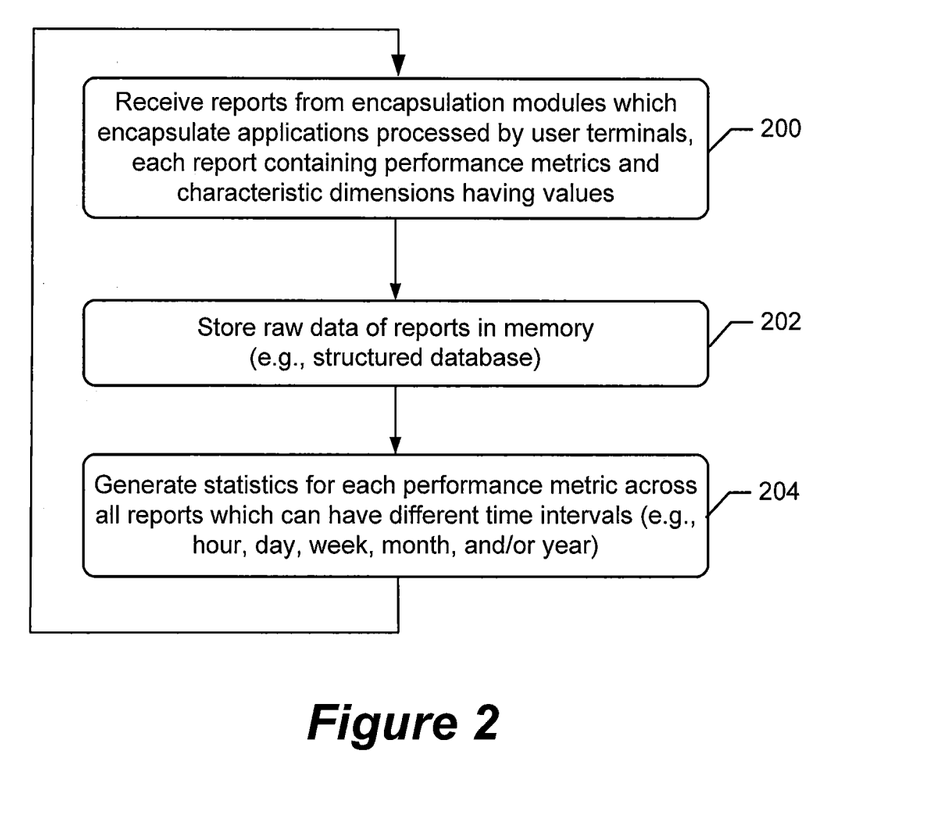
FIG. 2 is a flowchart of operations that may be performed by an application analysis computer for receiving, storing, and generating statistics from reports in accordance with some embodiments of the present disclosure.

FIG. 2 is a flowchart of operations that may be performed by the application analysis computer 150 for receiving, storing, and generating statistics from reports regarding operation of applications (e.g., application program 106) on user terminals 102a-n in accordance with some embodiments of the present disclosure.

Referring to FIG. 2, reports are received (block 200) from user terminals. Different types of applications and/or versions of the same application may generate reports at different time intervals, such as every minute, hour, day, week, month, or year, and the reporting time intervals may vary over time responsive to one or more defined conditions being satisfied and/or responsive to a command message from the application analysis computer 150 and/or the application server 140. A report contains a performance metric for the application 106 processed by the user terminal 102 and characteristic dimensions having values characterizing the application 106 and the user terminal 102. Raw data contained in the reports can be stored (block 202) in a memory, such as in a structured database residing across an array of networked data servers. Statistics are separately generated (block 202) for each different one of the performance metrics across the reports for each of the repeating time intervals. The statistic may be generated by numerically combining (e.g., averaging) values of one of the performance metrics in all reports received during one of the time intervals.

Figure 3:
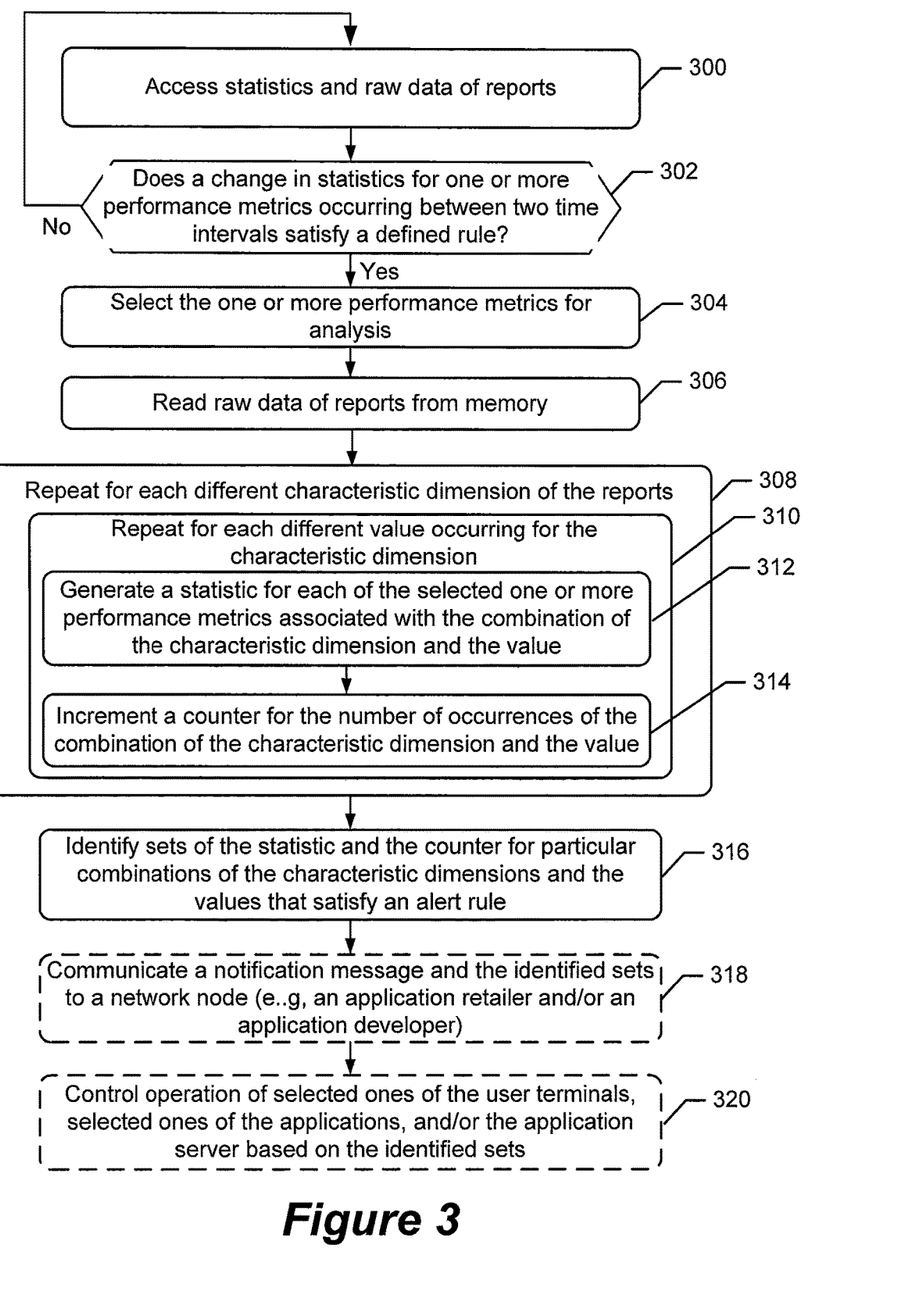
FIG. 3 is a flowchart of operations that may be performed by an application analysis computer for generating and using statistics for combinations of different reported characteristic dimensions and values in accordance with some embodiments of the present disclosure.

FIG. 3 is a flowchart of operations that may be performed by the application analysis computer 150 for generating and using statistics for combinations of different reported characteristic dimensions and values in accordance with some embodiments of the present disclosure.

Referring to FIG. 3, the application analysis computer 150 identifies one of the statistics for one of the performance metrics that has changed between two of the time intervals by an amount that satisfies a defined rule. For example, the raw data stored in the memory and the statistics generated therefrom can be accessed (block 300) by the application analysis computer 150, and a decision (block 302) is made whether one of the performance metrics occurring between two time interval satisfies the defined rule. If so, the application analysis computer 150 selects (block 304) the one of the performance metrics for analysis. Although the operations of FIG. 3 are described in the context of a single performance metric being selected (block 304), in some other embodiments more than one performance metric is selected based on observing changes with those performance metrics that satisfy one or more of the defined rules.

For each combination of a different one of the characteristic dimensions (operational loop indicated by block 308) and a different one of the values occurring for the characteristic dimension (operational loop indicated by block 310), a statistic is generated (block 312) for the selected one of the performance metrics associated with the combination of the characteristic dimension and the value among the reports, and a counter is incremented (block 314) which tracks a number of occurrences of the combination of the characteristic dimension and the value among the reports.

In the operational loops indicated by blocks 308 and 310, for each combination of a different one of the characteristic dimensions and a different one of the values occurring for the characteristic dimension, a statistic can be generated for the selected one of the performance metrics associated with the combination of the characteristic dimension and the value among the reports, based on selecting a combination of a unique characteristic dimension from among the different ones of the characteristic dimensions and a unique value from among the different ones of the values occurring for the unique characteristic dimension among the reports, and generating a combined statistic based on numerically combining the selected one of the performance metrics associated with the unique characteristic dimension and the unique value among the reports. The operations for selecting a combination and for generating a combined statistic are repeated for other unique combinations of the characteristic dimensions and the values among the reports. Each of the combined statistics is associated with a different one of the combinations. The operations for selecting a combination and for generating a combined statistic may be repeated for other unique combinations of the characteristic dimensions and the values among the reports until a last unique combination of the characteristic dimensions and the values has been selected and used to generate a combined statistic.

The statistic for the selected one of the performance metrics associated with the combination of the characteristic dimension and the value among the reports, may be generated (block 312) based on numerically combining the selected one of the performance metrics associated with the combination of the characteristic dimension and the value among the reports without including any of the selected one of the performance metrics among the reports which is not associated with the combination of the characteristic dimension and the value. The numerical combining may be performed by averaging values of the selected one of the performance metrics associated with the combination of the characteristic dimension and the value among the reports without including any of the selected one of the performance metrics among the reports which is not associated with the combination of the characteristic dimension and the value. The numerical combining may alternatively be performed by generating trend information based on content of the selected one of the performance metrics associated with the combination of the characteristic dimension and the value among the reports without including any of the selected one of the performance metrics among the reports which is not associated with the combination of the characteristic dimension and the value.

Sets of the statistic and the counter for particular ones of the combinations of the characteristic dimension and the value that satisfy an action rule, are identified (block 316). It is noted that the sets may be generated by a single pass through the raw data from the reports to identify the sets, which may allow the application analysis computer 150 to process a tremendous number of reports from a tremendous number of combinations of differing application characteristics and user terminal characteristics using less expensive and/or reduced complexity hardware and software resources.

A message is generated (e.g., block 318 or block 320) which contains information that is defined based on the sets. The application analysis computer 150 may generate a notification message identifying the sets of the statistic and the counter for particular ones of the combinations of the characteristic dimension and the value that satisfy the action rule, and communicate the notification message towards a network node via the data network 120. The application analysis computer 150 may alternatively or additionally generate a notification message that identifies characteristics of an application and a user terminal 102 which may have problematic operation determined based on the action rule, and communicate the notification message towards the application server 140 via the data network 120. The application server 140 may respond to the notification message by disabling further download of a particular application program to particular ones of the user terminals 102a-n identified based on the sets reported in the notification message, and/or by generating a message to the particular ones of the user terminals 102a-n offering an alternative version of the particular application program and/or a substitute application program for replacing the particular application program. The counter(s) may be used to determine whether, for example, a sufficient number of instances of the identified application operations (e.g., problems) have been identified such that an remedial action or other action should be initiated.

Still alternatively or additionally, the application analysis computer 150 may generate a notification message that identifies characteristics of an application which may have problematic operation determined based on the action rule, and communicate the notification message towards user terminals that process applications having the identified characteristics.

In the embodiment of FIG. 3, the application analysis computer 150 may communicate (block 318) a notification message containing information identifying the sets to the network node, such as the application server 140, another application retailer, and/or an application developer's computer. Alternatively or additionally, the application analysis computer 150 may control (block 320) operation of selected ones of the user terminals 102a-n, selected ones of the applications, and/or application server 140 based on content of the identified sets. When the application analysis computer 150 communicates a command to selected user terminals 102, the instrument encapsulation module 108 can adapt operation of the application program 106 based on the command, such as to disable operation of the application program 106 and/or to display a message on a display device of the selected user terminals 102.

As explained above, each report can contain a performance metric for the application program 106 being processed by the user terminal 102, and characteristic dimensions having values characterizing the application program 106 and/or the user terminal 102. The performance metrics may be generated by the reporting encapsulation module 108 which encapsulates the application program 106 to monitor operation of a present instance of the application program 108 processed by the user terminal 102 and related utilization of resources of the user terminal 102. The characteristic dimensions may characterize features and other characteristics of the application program 106 and the user terminal 102 which may be separate or independent from how a present instance of the application program 106 is presently operating while processed by the user terminal 102.

The performance metrics may include any one or more of the following:
1. application program 106 utilization of user terminal 102 processor resources;
2. application program 106 utilization of user terminal 102 memory resources;
3. application program 106 utilization of user terminal 102 network interface resources;
4. application program 106 communication latency through the data network 120 and/or the radio access network 130;
5. communication latency between the application program 106 and the application program 104;
6. application program 106 response latency to defined input;
7. application program 106 wait time for receipt of user input;
8. rate of information displayed by the application program 106 on a display device of the user terminal 102;
9. duration of operational use of the application program 106 by the user;
10. time between instances of application program 106 use;
11. time of day and/or day or week of instances of application program 106 use;
12. velocity of the user terminal 102 while processing the application program 106;
13. control gestures or other inputs provided by a user as input to control application program 106 operation;
14. which features and/or sequences of features of the application program 106 are used;
15. how often features and/or sequences of features of the application program 106 are used;
16. number of features or levels of features of the application program 106 accessed or completed by a user;
17. events characterizing inefficient or ineffective operational use of the application program 106;
18. user selection of additional in-application features (e.g., download/activate);
19. user selection of other application programs (e.g., download/activate) while using the application program 106;
20. information characterizing data communications between the application program 106 and another application program, an operating system 110, and/or to other software/hardware resources of the user terminal;
21. events indicative of errors or undesirable operation of the application program 106;

The application analysis computer 150 may generate a separate statistic for each of the performance metrics contained in the report, e.g., one statistic for application program 106 utilization of user terminal 102 processor resources, another statistic for application program 106 utilization of user terminal 102 memory resources, etc.) A statistic may be generated by numerically combining (e.g., averaging) values of one of the performance metrics in all of the reports (e.g., block 204) or in only reports having a defined combination of the characteristic value and the value (e.g., block 314), which are received during a selected one of the time intervals. Resource utilization may be reported in one or more of the reports as a percentage value, as an indicated resource level among a plurality of defined resource levels, etc.

The characteristic dimensions and corresponding values (bracketed) may include one or more of the following:
1. location geographic coordinates (values among defined list of defined regions);
2. location city (values among defined list of cities);
3. location state (values among defined list of states);
4. location country (values among defined list of countries);
5. application identifier (values among list of defined identifiers);
6. application version (values among list of defined versions);
7. application functionality (values among list of defined functions);
8. application display update rate capabilities (values among list of defined capabilities);
9. application preferred or required memory capacity (values among list of defined capacities);
10. application preferred or required processor capacity (values among list of defined capacities);
11. application preferred or required network communication capacity (values among list of defined capacities);
12. application preferred or required co-executed other application(s) (values among list of defined applications);
13. user terminal identifier (values among list of defined identifiers);
14. user terminal manufacturer (values among list of defined manufacturer identifiers);
15. user terminal model (values among list of defined models);
16. user terminal processor type (values among list of defined types);
17. user terminal memory capacity (values among list of defined capacities);
18. user terminal communication capability (values among list of defined communication capabilities);
19. user terminal operating system type (values among list of defined types);
20. user terminal operating system version (values among list of defined versions);
21. user terminal display resolution (values among list of defined resolutions);
22. user terminal camera resolution (values among list of defined resolutions);
23. user terminal screen refresh rate capability (values among list of defined capabilities);
24. user terminal speaker volume capability (values among list of defined capabilities);
25. wireless carrier registered with user terminal (values among list of defined carriers);
26. user selected user-interface language (values among list of defined languages);
27. user information (values among list of defined names, attributes, etc.);
28. operational settings selected by the user for operation of the application program 106 and/or changes over time in the user selected operational settings;
29. gaming challenges or levels of the application program 106 selected by the user from among available challenges or levels;
30. other application programs active in background while user is using the application program 106; and
31. occurrence of one or more defined control gestures performed by the user through a user interface of the user terminal 102 to interface with the application program 106 and/or frequency of occurrence of the one or more defined control gestures.

Figure 4:
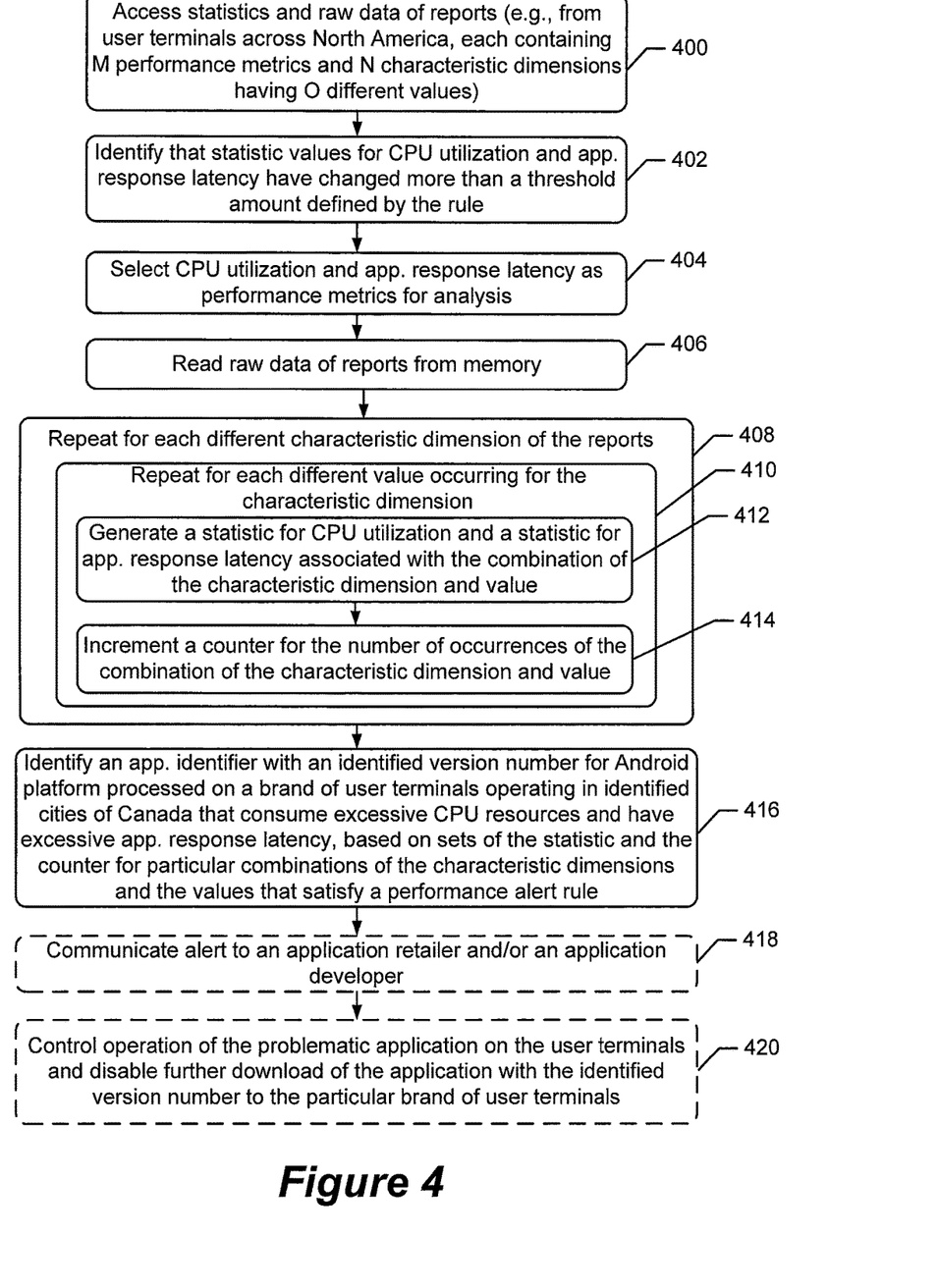
FIG. 4 is a flowchart of operations that may be performed by an application analysis computer for generating statistics for combinations of different reported characteristic dimensions and values relating to CPU utilization and application response latency performance metrics and for identifying possible problematic application operation, in accordance with some embodiments of the present disclosure.

Further example operations are now described in the context of the nonlimiting embodiment of FIG. 4, which is a flowchart of operations that may be performed by the application analysis computer 150 for generating statistics for combinations of different reported characteristic dimensions and values relating to CPU utilization and application response latency performance metrics. The operations may be used to identify possible problematic application operation.

Referring to FIG. 4, the application analysis computer 150 accesses (block 400) statistics of raw data of reports. In the example embodiment, the reports are received from user terminals across North America, and each report contains M performance metrics, N characteristic dimensions having O different values. For the reasons explained above, the numbers M, N, and O can be large. As will be explained below, the operations provided in FIG. 4 can identify problematic operations by a particular application processed by a particular version of an operating system on a particular brand of user terminal operating within a particular city, which may assist with determining the underlying bases for the problem.

Statistic values for CPU utilization and application response latency are identified (block 402) as each having changed more than threshold amounts defined by a rule. CPU utilization and application response latency are therefore selected (block 404) as performance metrics for further analysis. The application analysis computer 150 reads (block 406) the raw data of the reports from the memory, e.g., the structured database.

For each combination of a different one of the characteristic dimensions (operational loop indicated by block 408) and a different one of the values occurring for the characteristic dimension (operational loop indicated by block 410), a statistic is separately generated (block 412) for each of CPU utilization and application response latency associated with the combination of the characteristic dimension and the value among the reports. A separate counter is incremented (block 414) which tracks a number of occurrences of the combination of the characteristic dimension and the value among the reports (i.e., one counter tracks occurrences of the CPU utilization associated with the combination, and another counter tracks occurrences of the application response latency associated with the combination).

The application analysis computer 150 identifies (block 416) for each report, a characteristic dimension for an application name having an associated identifier value, a characteristic dimension for an operating system having an associated value for a version number of Android, a characteristic dimension for a user terminal brand with a value identifying the manufacturer, a characteristic dimension for city location with a value identifying a city within Canada where the user terminal is located. The application analysis computer 150 identifies based on the sets of the statistics and the counters for the combinations of characteristic dimensions and values that satisfy a performance alert rule, that applications associated with the combinations have been observed consuming excessive CPU resources and having excessive application response latency. In this manner, when an application is operating improperly due to, for example, operational requirements of an application not being satisfied by local telecommunications performance and/or compatibility issues, the sets of statistics and associated combinations of characteristic dimensions and values can enable the application analysis computer to quickly pinpoint potential bases for the application operational problems and the extent of the problem. Application retailers may thereby restrict or prevent usage of the application by user terminals that are unable to properly execute the application and/or may deploy a different version of the application or a substitute for the application to those user terminals. Application developers may be notified of the bases of the application operational problem so that future versions of the application may avoid or compensate for such operation.

In the embodiment of FIG. 4, the application analysis computer 150 may communicate (block 418) an alert message containing information identifying the sets to a network node, such as the application server 140 or another application retailer, and/or an application developer's computer. Alternatively or additionally, the application analysis computer 150 may control (block 420) operation of the problematic application on user terminals that are processing that application, and may control the application server 140 to disable further download of the problematic application with identified version number to the particular brand of user terminals located in the identified cities within Canada.

Figure 5:
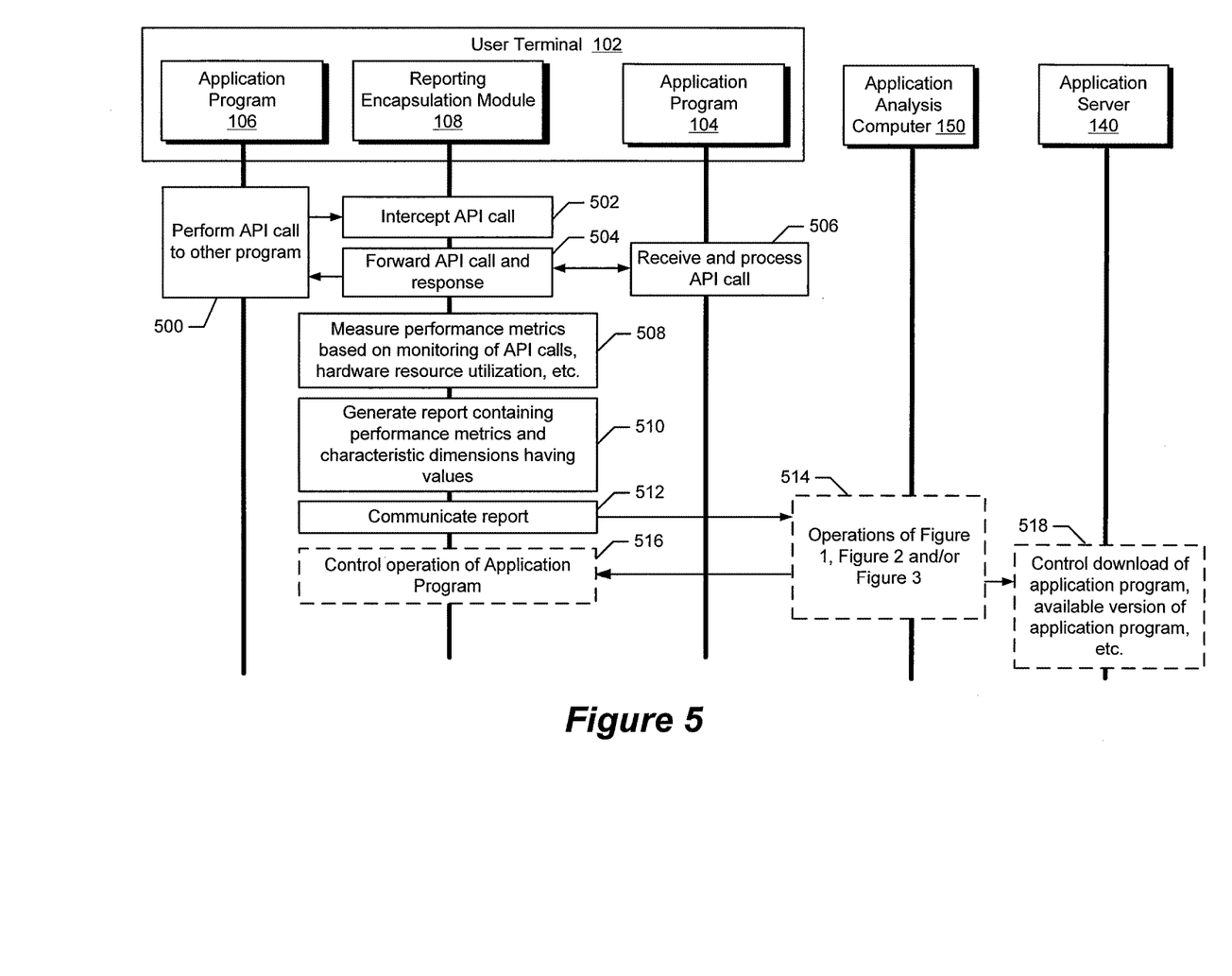
FIG. 5 is a combined data flow diagram and flowchart of operations by a user terminal, an application analysis computer, and an application server in accordance with some embodiments of the present disclosure.

FIG. 5 is a combined data flow diagram and flowchart of operations by a user terminal 102, the application analysis computer 150, and the application server 140 in accordance with some embodiments of the present disclosure.

Referring to FIG. 5, the application program 106 performs an API call (block 500) to the other application program 104. The reporting encapsulation module 108 intercepts (block 502) the API call. The reporting encapsulation module 108 forwards (block 504) the API call to the other application program 104, which receives and processes (block 506) the API call. The other application program 104 may communicate a response message which is intercepted and forwarded (block 504) through the reporting encapsulation module 108 to the application program 106.

The reporting encapsulation module 108 measures (block 508) performance metrics based on monitoring the API calls, hardware resource utilization, etc, and generates (block 510) a report containing performance metrics and characteristic dimensions having values such as described above. The report is communicated (block 512) toward the application analysis computer 150. The operations for measuring, generating reports, and communicating reports are performed repetitively according to a defined time interval, which may vary over time responsive to occurrence of a condition defined by a rule and/or responsive to a message from the application analysis computer 150 and/or from the application server 140.

The application analysis computer 150 performs operations (block 514) shown in FIG. 1, FIG. 2, and/or FIG. 3 in accordance with some embodiments. The application analysis computer 150 may communicate a notification message to control (block 516) operation of application program 106 on the user terminal 102. Application analysis computer 150 may alternatively or additionally communicate a notification message to control (block 518) downloading of the application program, which version of the application program is available for downloading, etc, such as described above.

Example User Terminal and Application Analysis Computer

Figure 6:
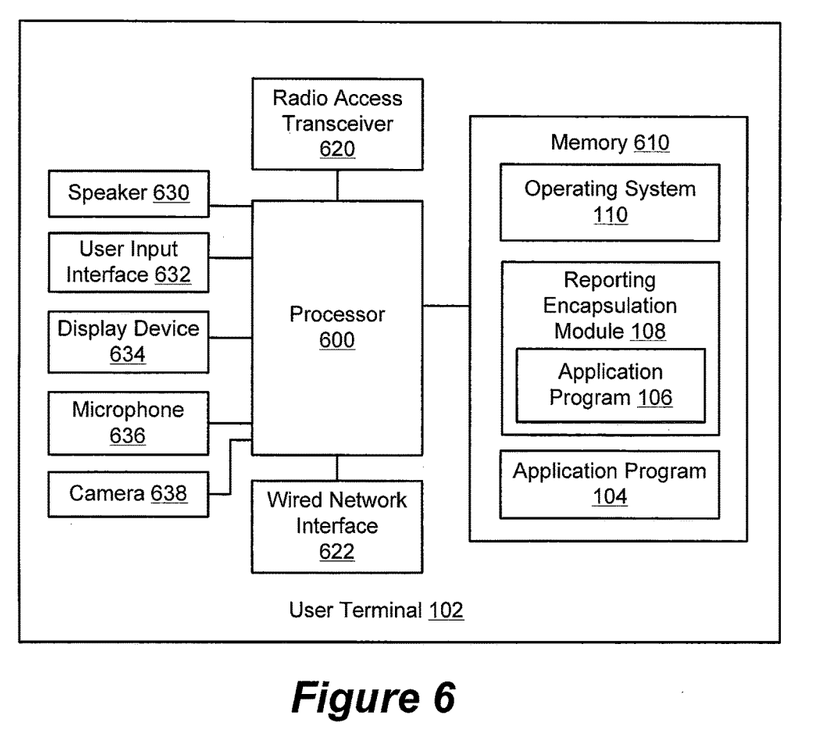
FIG. 6 is a block diagram of a user terminal configured according to some embodiments of the present disclosure.

FIG. 6 is a block diagram of a user terminal 102 configured according to some embodiments of the present disclosure. Referring to FIG. 6, the user terminal 102 includes a processor 600, a memory 610, and a network interface which may include a radio access transceiver 620 and/or a wired network interface 102 (e.g., Ethernet interface). The radio access transceiver 620 can include, but is not limited to, a LTE or other cellular transceiver, WLAN transceiver (IEEE 802.11), WiMax transceiver, or other radio communication transceiver configured to communicate with the application analysis computer 150 via a radio access network.

The processor 600 may include one or more data processing circuits, such as a general purpose and/or special purpose processor, such as a microprocessor and/or digital signal processor. The processor 600 is configured to execute computer program code in the memory 610, described below as a non-transitory computer readable medium, to perform at least some of the operations described herein as being performed by a user terminal. The computer program code may include an operating system 110, a plurality of application programs 104 and 106, and an instrument encapsulation module 108. The instrument encapsulation module 108 when executed by the processor 600 causes the processor 600 to perform operations in accordance with one or more embodiments disclosed herein. The user terminal 102 may further include a speaker 630, a user input interface 632 (e.g., touch screen, keyboard, keypad, etc.), a display device 634, a microphone 636, and a camera 638. As used herein, the term "user terminal" may include a cellular radiotelephone, satellite radiotelephone, a gaming console, a smart appliance, a tablet computer, a laptop computer, and/or a desktop computer.

Figure 7:
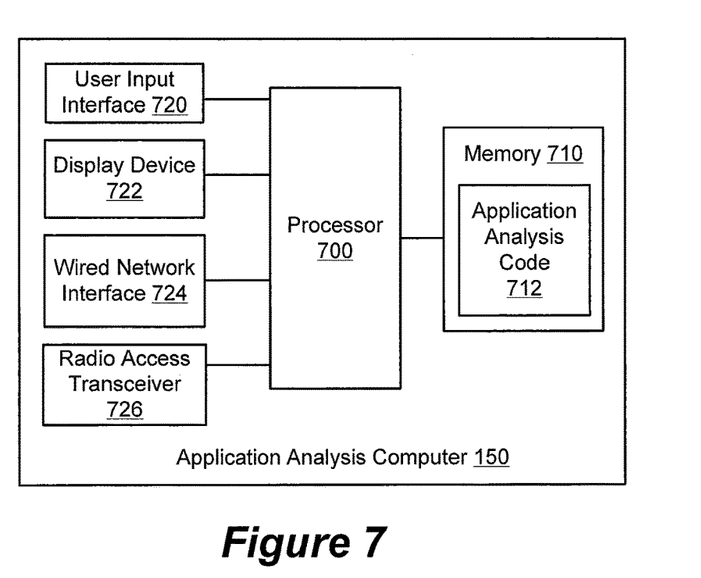
FIG. 7 is a block diagram of an application analysis computer configured according to some embodiments of the present disclosure.

FIG. 7 is a block diagram of an application analysis computer 150 configured according to some embodiments of the present disclosure. The application analysis computer 150 includes a processor 700, a memory 710, and a network interface which may include a radio access transceiver 726 and/or a wired network interface 724 (e.g., Ethernet interface). The radio access transceiver 726 can include, but is not limited to, a LTE or other cellular transceiver, WLAN transceiver (IEEE 802.11), WiMax transceiver, or other radio communication transceiver configured to communicate with the user terminal 102 via a radio access network.

The processor 700 may include one or more data processing circuits, such as a general purpose and/or special purpose processor (e.g., microprocessor and/or digital signal processor) that may be collocated or distributed across one or more networks. The processor 700 is configured to execute computer program code in the memory 710, described below as a non-transitory computer readable medium, to perform at least some of the operations described herein as being performed by an application analysis computer. The computer program code may include application analysis code 712 that when executed by the processor 700 causes the processor 700 to perform operations in accordance with one or more embodiments disclosed herein for the application analysis computer 150. The application analysis computer 150 may further include a user input interface 720 (e.g., touch screen, keyboard, keypad, etc.) and a display device 722.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A computer program product, comprising:
a non-transitory computer readable storage medium comprising computer readable program code embodied in the medium that when executed by a processor of an application analysis computer causes the processor to perform operations comprising:
receiving, from mobile user communication terminals over a communication network, reports containing: performance metrics for applications operated by the mobile user communication terminals and characteristic dimensions having values characterizing features of the applications operated by the mobile user communication terminals, the characteristic dimensions being independent of the performance metrics;
generating combined numerical values for each different one of the performance metrics across the reports for repeating time intervals;
identifying one of the combined numerical values for one of the performance metrics that has changed between two of the time intervals by an amount that satisfies a defined rule;
selecting the one of the performance metrics of the identified combined numerical values satisfying the defined rule to identify sets of combined numerical values of the characteristic dimensions associated with the selected performance metric;
for each combination of a different one of the characteristic dimensions and a different one of the values of the characteristic dimensions occurring for the characteristic dimensions associated with the selected performance metric:
generating a set of combined numerical values for the selected one of the performance metrics associated with the combination of the characteristic dimensions and the values of the characteristic dimensions among the reports, and
incrementing a counter that tracks a number of occurrences of the combination of the characteristic dimension and the values of the characteristic dimensions among the reports;
identifying sets of the combined numerical values and the counter for particular ones of the combinations of the characteristic dimensions and the values of the characteristic dimensions that satisfy an action rule;
responsive to satisfying the action rule, identifying an application that has problematic operation when executed by one or more of the mobile user terminals based on the identified sets of combined numerical values;

selecting a set of the mobile user communication terminals that process the identified application;

responsive to selecting the set of the mobile user communication terminals:

generating notification messages for the set of the mobile user communication terminals containing information that identifies the application which that has problematic operation and a command to disable operation of the application by the set of the mobile user communication terminals; and communicating the notification messages towards the set of the mobile user communication terminals that process the application to disable operation of the application having the identified characteristics by the set of the mobile user communication terminals via the communication network.

2. The computer program product of claim 1, wherein for each combination of a different one of the characteristic dimensions and a different one of the values occurring for the characteristic dimension, the generating a set of combined numerical values for the selected one of the performance metrics associated with the combination of the characteristic dimensions and the values of the characteristic dimensions among the reports, comprises:

selecting a combination of a unique characteristic dimension from among the different ones of the characteristic dimensions and a unique value from among the different ones of the values occurring for the unique characteristic dimension among the reports;

generating a combined numerical value based on numerically combining the selected one of the performance metrics associated with the unique characteristic dimension and the unique value among the reports; and repeating the selecting a combination and the generating a combined numerical value for other unique combinations of the characteristic dimensions and the values among the reports, wherein each of the combined numerical values are associated with a different one of the combinations.

3. The computer program product of claim 2, wherein the repeating the selecting a combination and the generating a combined numerical value for other unique combinations of the characteristic dimensions and the values among the reports, comprises:

repeating the selecting a combination and the generating a combined numerical value for other unique combinations of the characteristic dimensions and the values among the reports until a last unique combination of the characteristic dimensions and the values has been selected and used to generate a combined numerical value.

4. The computer program product of claim 3, wherein the generating combined numerical values for each different one of the performance metrics across the reports during repeating time intervals, comprises:

numerically combining values of one of the performance metrics in all reports received during one of the time intervals.

5. The computer program product of claim 1, wherein for each combination of a different one of the characteristic dimensions and a different one of the values occurring for the characteristic dimension, generating a set of combined numerical values for the selected one of the performance metrics associated with the combination of the characteristic dimensions and the values of the characteristic dimensions among the reports, comprises:

generating the set of combined numerical values based on numerically combining the selected one of the performance metrics associated with the combination of the characteristic dimension and the value among the reports without including any of the selected one of the performance metrics among the reports which is not associated with the combination of the characteristic dimension and the value.

6. The computer program product of claim 5, wherein the generating the set of combined numerical values based on numerically combining the selected one of the performance metrics associated with the combination of the characteristic dimension and the value among the reports without including any of the selected one of the performance metrics among the reports which is not associated with the combination of the characteristic dimension and the value, comprises:

averaging values of the selected one of the performance metrics associated with the combination of the characteristic dimension and the value among the reports without including any of the selected one of the performance metrics among the reports which is not associated with the combination of the characteristic dimension and the value.

7. The computer program product of claim 5, wherein the generating the set of combined numerical values based on numerically combining the selected one of the performance metrics associated with the combination of the characteristic dimension and the value among the reports without including any of the selected one of the performance metrics among the reports which is not associated with the combination of the characteristic dimension and the value, comprises:

generating trend information based on content of the selected one of the performance metrics associated with the combination of the characteristic dimension and the value among the reports without including any of the selected one of the performance metrics among the reports which is not associated with the combination of the characteristic dimension and the value.

8. The computer program product of claim 1, wherein the selected one of the performance metrics comprises values, in at least some of the reports, each indicating mobile user communication terminal processor utilization while processing an application operated by the mobile user communication terminal.

9. The computer program product of claim 1, wherein the selected one of the performance metrics comprises values, in at least some of the reports, each indicating mobile user communication terminal memory utilization while processing an application operated by the mobile user communication terminal.

10. The computer program product of claim 1, wherein the selected one of the performance metrics comprises values, in at least some of the reports, each indicating response latency by an application operated by a mobile user communication terminal.

11. The computer program product of claim 1, wherein the selected one of the performance metrics comprises values, in at least some of the reports, each indicating a mobile user communication terminal network communication utilization by an application operated by a mobile user communication terminal.

12. The computer program product of claim 1, wherein the selected one of the performance metrics comprises values, in at least some of the reports, each indicating duration of operational use of an application by a user of a mobile user communication terminal.

13. The computer program product of claim 1, wherein the selected one of the performance metrics comprises information, in at least some of the reports, each characterizing data communications between two applications operated by a mobile user communication terminal.

14. The computer program product of claim 1, wherein the characteristic dimensions in at least some of the reports characterize a city, a state, and a country where the mobile user communication terminals which generated those reports were located when the reports were communicated to the application analysis computer.

15. The computer program product of claim 1, wherein the characteristic dimensions in at least some of the reports identify one of the applications and identify a version of the one of the applications processed by the mobile user communication terminals which generated those reports when the reports were communicated to the application analysis computer.

16. The computer program product of claim 1, wherein the characteristic dimensions in at least some of the reports identify for each of the mobile user communication terminals which generated those reports, mobile user communication terminal identifiers, mobile user communication terminal operating system types, mobile user communication terminal operating system versions, and mobile user communication terminal wireless carrier identifiers.

17. The computer program product of claim 1, wherein the non-transitory computer readable storage medium comprising the computer readable program code embodied in the medium that when executed by the processor of the application analysis computer causes the processor to further perform operations comprising:
communicating the notification message toward an application server that downloads the application to mobile user communication terminals to:
communicate potential characteristic dimensions of the applications operated by the mobile user communication terminals potentially responsible for operational problems of the mobile user terminals;
trigger the network node to disable further download of the application associated with the identified sets of the combined numerical values from the network node by the mobile user communication terminals.

18. A method comprising:
performing operations as follows on a processor of an application analysis computer:
receiving, from mobile user communication terminals over a communication network, reports containing:
performance metrics for applications operated by the mobile user communication terminals and characteristic dimensions having values characterizing features of the applications operated by the mobile user communication terminals, the characteristic dimensions being independent of the performance metrics;
generating combined numerical values for each different one of the performance metrics across the reports for repeating time intervals;
identifying one of the combined numerical values for one of the performance metrics that has changed between two of the time intervals by an amount that satisfies a defined rule;
selecting the one of the performance metrics of the identified combined numerical values satisfying the defined rule to identify sets of combined numerical values of the characteristic dimensions associated with the selected performance metric;
for each combination of a different one of the characteristic dimensions and a different one of the values of the characteristic dimensions occurring for the characteristic dimensions associated with the selected performance metric:
generating a set of combined numerical values for the selected one of the performance metrics associated with the combination of the characteristic dimensions and the values of the characteristic dimensions among the reports, and
incrementing a counter that tracks a number of occurrences of the combination of the characteristic dimension and the values of the characteristic dimensions among the reports;
identifying sets of the combined numerical values and the counter for particular ones of the combinations of the characteristic dimensions and the values of the characteristic dimensions that satisfy an action rule;
responsive to satisfying the action rule, identifying an application that has problematic operation when executed by one or more of the mobile user terminals based on the identified sets of combined numerical values;
selecting a set of the mobile user communication terminals that process the identified application;
responsive to selecting the set of the mobile user communication terminals:
generating notification messages for the set of the mobile user communication terminals containing information that identifies the application which that has problematic operation and a command to disable operation of the application by the set of the mobile user communication terminals; and
communicating the notification messages towards the set of the mobile user communication terminals that process the application to disable operation of the application having the identified characteristics by the set of the mobile user communication terminals via the communication network.

19. A method comprising:
performing operations as follows on a processor of an application analysis computer:
receiving, from mobile user communication terminals over a communication network, reports containing:
performance metrics for applications operated by the mobile user communication terminals and characteristic dimensions having values characterizing features of the applications operated by the mobile user communication terminals, the characteristic dimensions being independent of the performance metrics;
selecting a performance metric from the received performance metrics that satisfy a defined rule;
for each combination of a different one of the characteristic dimensions and a different one of the values of the characteristic dimensions occurring for the characteristic dimensions associated with the selected performance metric:

generating a set of combined numerical values for the selected performance metric associated with the combination of the characteristic dimensions and the values of the characteristic dimensions from among the received reports, and incrementing a counter that tracks a number of occurrences of the combination of the characteristic dimension and the values of the characteristic dimensions among the reports;

identifying sets of the combined numerical values, the counter for particular ones of the combinations of the characteristic dimensions, and the values of the characteristic dimensions that satisfy an action rule;

responsive to satisfying the action rule, identifying an application that has problematic operation when executed by one or more of the mobile user terminals based on the identified sets of combined numerical values;

selecting a set of the mobile user communication terminals that process the identified application;

responsive to selecting the set of the mobile user communication terminals:

generating notification messages for the set of the mobile user communication terminals containing information that identifies the application which that has problematic operation and a command to disable operation of the application by the set of the mobile user communication terminals; and communicating the notification messages towards the set of the mobile user communication terminals that process the application to disable operation of the application having the identified characteristics by the set of the mobile user communication terminals via the communication network.

* * * * *